United States Patent [19]

Lilly

[11] 4,063,676
[45] Dec. 20, 1977

[54] FRICTION WELDING METHODS AND APPARATUS

[75] Inventor: Rodger H. Lilly, Comberton, England

[73] Assignee: The Welding Institute, Cambridge, England

[21] Appl. No.: 636,616

[22] Filed: Dec. 1, 1975

[30] Foreign Application Priority Data

Dec. 2, 1974 United Kingdom ............... 52126/74

[51] Int. Cl.² ............................................. B23K 19/02
[52] U.S. Cl. ......................................... 228/114; 228/2
[58] Field of Search ............................... 228/112–114, 228/2; 156/73.5

[56] References Cited

U.S. PATENT DOCUMENTS

| 3,134,278 | 5/1964 | Hollander et al. | 228/2 |
| 3,874,067 | 4/1975 | Toyooka et al. | 228/112 |
| 3,917,497 | 11/1975 | Stickler | 156/73.5 |

FOREIGN PATENT DOCUMENTS

| 648,110 | 9/1962 | Canada | 228/112 |
| 13,516 | 6/1968 | Japan | 228/112 |

*Primary Examiner*—Donald G. Kelly
*Assistant Examiner*—K. J. Ramsey
*Attorney, Agent, or Firm*—Cushman, Darby & Cushman

[57] ABSTRACT

This invention relates to joining a ring to a tube passing through the ring, for example, or for joining two pipes end to end by means of a ring. In one form of the invention the ring is radially compressed during relative rotation of the parts to be joined by a pressure substantially uniformly distributed around the ring to develop frictional heat and to cause penetration of the ring into the tube or aligned pipes. The relative rotation is then stopped and a friction weld is formed.

Many variations are possible: for example a rotating internal ring may be expanded by radial pressure and thereby friction welded to a tube or across the junction of two pipes.

21 Claims, 9 Drawing Figures

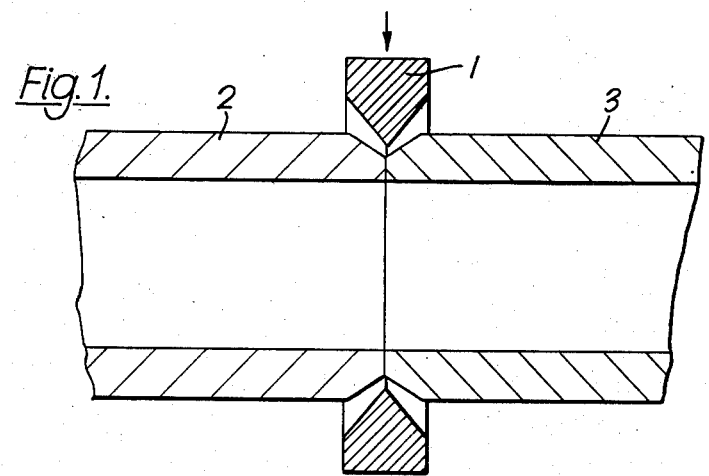
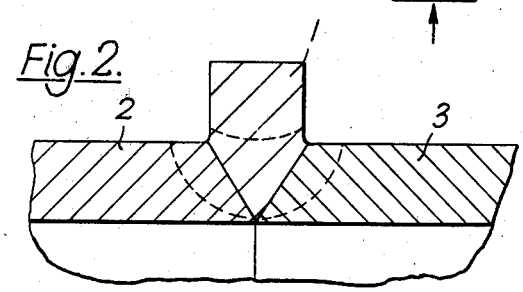
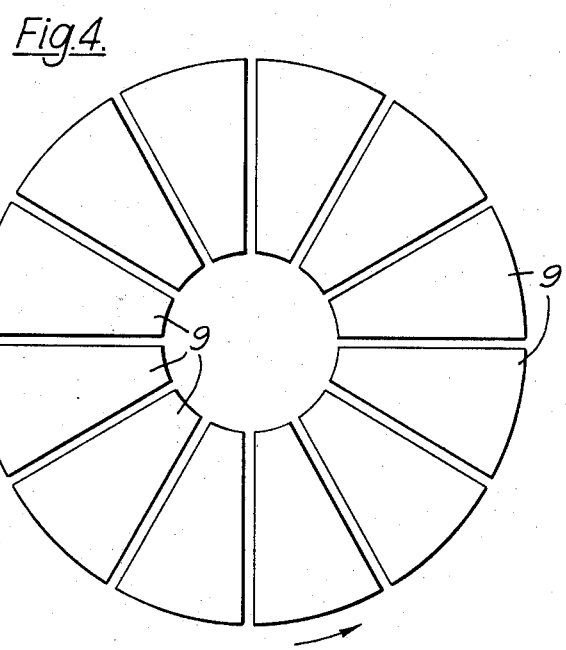
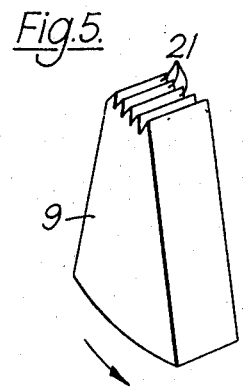

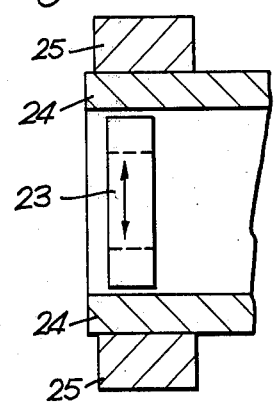
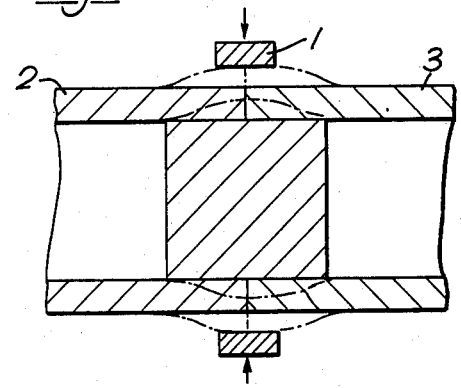
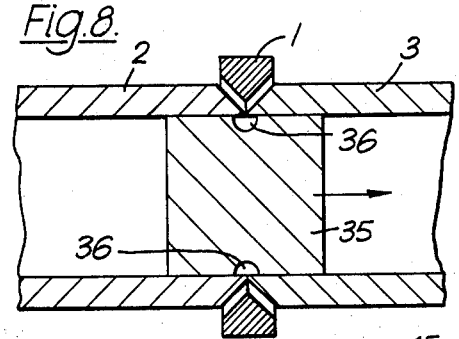
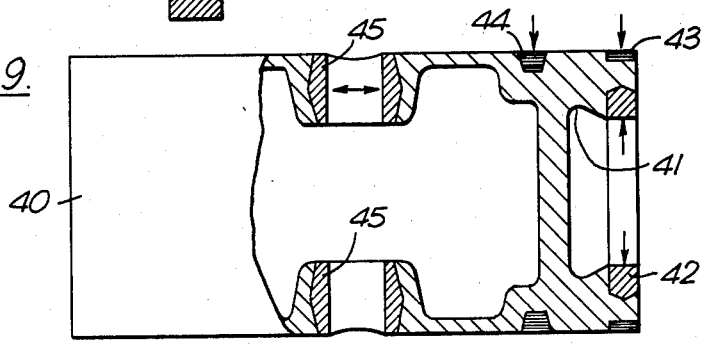

FRICTION WELDING METHODS AND APPARATUS

In conventional friction welding for joining two tubes or bars, the end faces of the tubes or bars to be joined are butted together and are relatively rotated under axial pressure to generate frictional heat. During the rotation, the metal which forms the end faces is forced out of the weld area to form an upset and when the relative rotation is stopped and the pressure is maintained or increased, a weld of high quality is obtained. The upset metal forms around the outside of the joint and, in the case of joined tubes, around the inside of the joint. The displacement from the joint area of the metal which was originally exposed at the ends of the workpieces, prior to their joining, is one of the factors which contributes to the high quality of the weld which is obtained.

It is frequently required to join a first member formed with a circular hole to a second member having a circular periphery, the second member lying co-axially within the circular hole of the first member; an example is the joining of the internal surface of a ring to the external surface of a tube to form a collar on the tube. We have discovered that it is possible to join such members successfully by friction welding, the process requiring a penetration of one of the members into the other member and involving a compression (or expansion) of one of the members to an extent which would not normally be considered possible.

According to the present invention, in a method of friction welding for joining a first member formed with a circular hole to a second member having a circular periphery, the two members are arranged with the said circular periphery of the second member within and co-axial with the circular hole of the first member and are given a relative rotation about the common axis of the said hole and periphery, and during such rotation the peripheral wall of one of the said members, remote from the other member, is subjected to pressure having a major component perpendicular to the said axis, the pressure being substantially uniformly distributed around the said peripheral wall and being directed to move the members into frictional contact, the relative rotation continuing until sufficient frictional heat has been developed and sufficient penetration has been achieved to permit a friction weld between the outer surface of the second member and the inner surface of the first member. The applied force may be continued after the end of rotation or even increased to consolidate the joint.

By the requirement that the pressure is "substantially uniformly distributed" around the peripheral wall of one of the members, we include, in addition to applying the pressure in a continuous manner around the whole of the peripheral wall, for example by a tapered collet, the application of pressure through a number of individual loading actuators spaced around the peripheral wall. These actuators should not be spaced further apart than four times the radial thickness of the member being loaded, with the proviso that for small-diameter tubes there must be at least five and preferably at least ten loading points.

In some applications, the inner diameter of the outer member may be less than the outer diameter of the inner member or members, for example where the inner members are two tubes with ends chamfered so that together they form a groove when the tubes are placed end to end, and the outer member is in the form of a ring placed between the chamfered surfaces before the tubes are butted together. The above statement that the circular periphery of the second member is within the circular hole of the first member is intended to include such a case, and any case in which the inner member is within the outer member in a plane perpendicular to the common axis of these members.

We are aware of U.S. specification No. 3,134,278 in which it is suggested in connection with FIGS. 17 and 18 that a ring with a cylindrical inner surface may be welded to the outside of a cylindrical body by friction welding. In this proposal, the ring was pressed on to the cylindrical body by a clamp in the form of a further ring with a single gap at which the ring ends were extended outwards to form spaced parallel jaws to which pressure could be applied. The ring to be joined to the cylindrical body was formed with a gap in its periphery; this gap in the ring would facilitate obtaining contact between the inner surface of the ring and the outer surface of the cylindrical body and, if present during frictional heating, would allow for circumferential expansion of the ring. To the best of our knowledge, there has been no commercial use of this proposal and since the present invention was made we have experimented with the method described. We have been unable to produce a satisfactory weld with this earlier proposal. The uneven stress distribution, which we have shown by photographs, results in insufficient penetration of the ring into the cylindrical body and as a consequence only discontinuous and easily fracturable areas of welding were produced. Thus, although the requirement for joining the inner or outer surface of a ring, for example, to a cylindrical member or members has existed since the beginning of friction welding, the requirement has not been met by the method proposed in the earlier disclosure.

We have found that it is unnecessary and is indeed inadvisable to leave a longitudinal gap in an outer member to be joined to an inner member and that, for example, a diameter reduction of 12.5 millimeters on a continuous ring the initial diameter of which was 50 millimeters, can be readily achieved. Moreover, the force necessary to achieve the initial compression or expansion to bring the members into frictional contact is not so high that it renders uncontrollable the subsequent compression or expansion during frictional heating. It is however essential for the pressure to be substantially uniformly distributed around the member to be compressed or expanded; in the absence of substantially uniform radial loading, this member distorts and there is inadequate heating and penetration to produce a circumferential friction weld.

Thus, a method embodying the present invention may be used with advantage to join two pipes or rods. It has previously been proposed to achieve this by friction welding but the earlier proposals involve either rotation of one pipe with respect to the other or the placing of a third tubular workpiece between the two pipes, the axial movement of at least one of the pipes to bring the two pairs of interfaces into contact, and the rotation of the intermediate workpiece relative to the pipe ends.

In order that the invention may be better understood, some examples of methods and apparatus embodying the invention will now be described with reference to the accompanying drawings, in which:

FIG. 1 illustrates diagrammatically the joining of two pipes;

FIG. 2 shows the weld produced by the method illustrated in FIG. 1;

FIG. 4 illustrates the jaw arrangement of the apparatus shown in FIG. 3;

FIG. 5 shows one of the jaws of FIGS. 3 and 4, modified for flash removal;

FIG. 6 illustrates diagrammatically a weld formed by expanding a welding ring on to a tube;

FIG. 7 shows the use of the expansion technique for joining tubes;

FIG. 8 illustrates a further method of joining two aligned tubes by an outer ring; and FIG. 9 illustrates the use of the invention in welding a ring at the entrance to the combustion chamber in the top of a piston for diesel engines.

Figure 3:
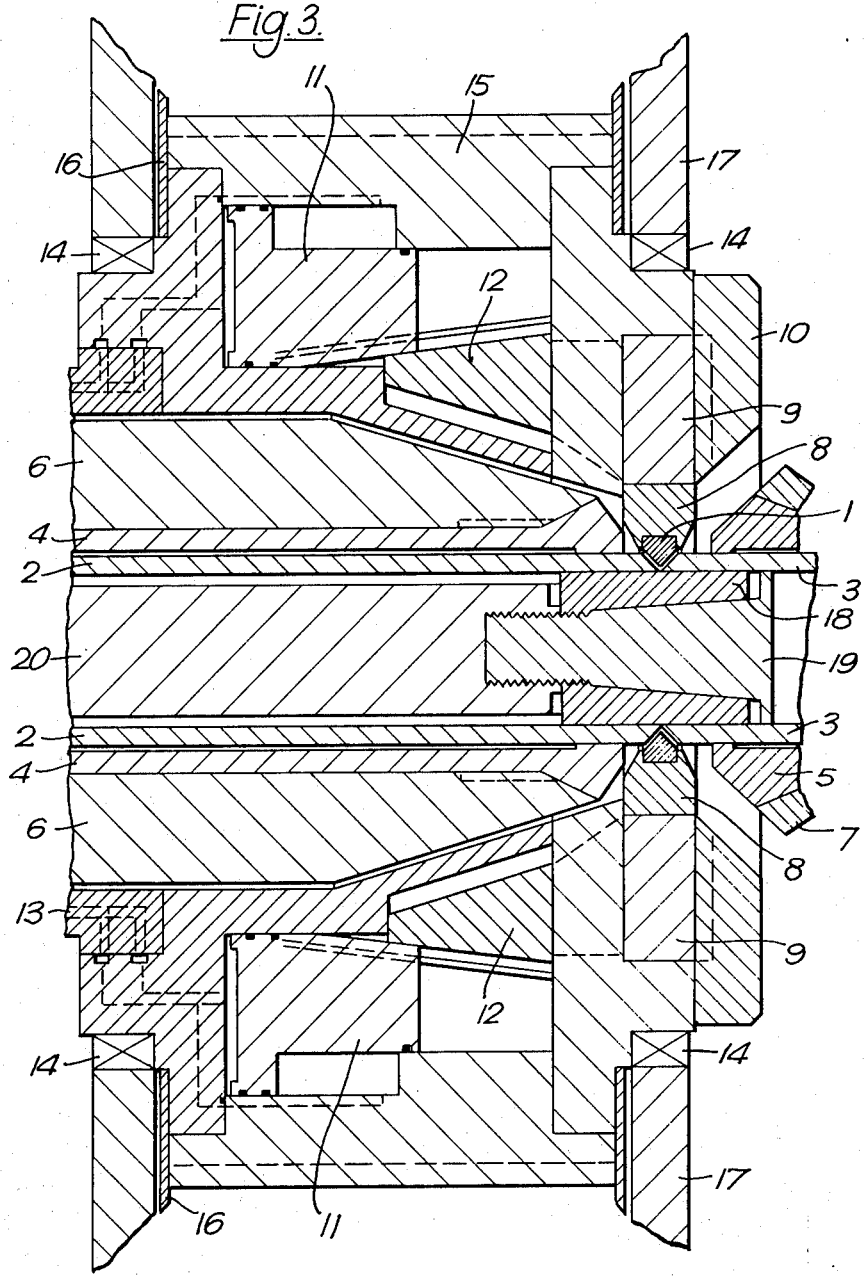
FIG. 3 is a section through apparatus for carrying out the process illustrated in FIG. 1.

FIG. 1 illustrates the initial positions of a ring 1 and two pipes 2 and 3 to which the ring is to be welded to join the pipes together. As shown in the drawing, the interface surfaces of the ring 1 and the pipes 2 and 3 are initially chamfered. Radial force is applied substantially all round the ring in the direction of the arrows to compress the ring.

FIG. 2 illustrates the joint made between the ring and the pipes, the chain-dotted lines indicating the approximate limits of the heat-affected zone.

FIG. 3 illustrates the welding head of a machine for making such a weld. In FIG. 3, the tubes 2 and 3 to be joined are held respectively in the collets 4 and 5 which are within collet housings 6 and 7 and which provide adequate gripping against forces produced during welding. The ring 1 is held in the jaw tip inserts 8 of twelve jaws 9.

Each jaw 9 is mounted in a guide assembly 10 for movement towards and away from the common axis of the tubes and ring. Movement of the jaws towards this axis is effected by an annular piston 11, movable parallel to the tube axis, having a tapered inner surface which co-operates with the tapered outer surfaces of actuating members 12 attached to the jaws 9. It will be seen that movement of the annular piston 11 to the right in the drawing produces inward radial movement of the jaws and thereby compresses the ring 1. An oil distributor 13 supplies the oil for moving the annular piston.

The assembly comprising the jaws, jaw guides, annular piston and actuators 11, is rotated in bearings 14 by means of an outer body 15 having timing belt teeth and side guides 16 for the belt. The bearings are supported by side plates 17.

To support the tubes when the ring is subjectd to radial compression, an expanding plug 18 is mounted on a mandrel 19 attached to a draw bar 20.

When the tubes and ring have been put in place and the plug 18 has been expanded by pulling on the draw bar until it provides an adequate support for the tubes, the ring is set in rotation and the annular piston is urged to the right to produce radial compression of the ring. When the ring contacts the tubes, frictional heating occurs and compression continues until sufficient penetration has been achieved for a friction weld. Rotation is then stopped but the radial compressional force is maintained or in some cases increased to a forging pressure to complete the weld.

The arrangement of the jaws around the axis is illustrated in FIG. 4. If desired, each jaw 9 can be given serrations or teeth 21 (see FIG. 5) which can be used, once the weld has been completed, for the removal of flash from the outer surface of the weld, this being accomplished by rotation of the jaws relative to the welded assembly.

If desired, an axial load can be applied to the tubes during forging.

The invention has been illustrated in connection with the joining of tubes by radial friction welding but it has numerous other applications. For example, the ring 1 can be welded to the outer surface of a single tube or solid bar to provide a collar on the tube or bar. In another example, a ring is expanded on to the inner surface of a tube, as indicated diagrammatically in FIG. 6, in which the ring 23 is to be welded to the tube 24. An annulus 25 supports the tube 24 and reacts against the welding force. If desired, the inner surface of the annulus 25 can be contoured to shape the outer wall of the welded assembly. Again, the expansion can be achieved by means of a tapered plunger and radially moving jaws forming part of an expanding collet.

If desired, for joining pipes an internal ring can be expanded against the abutted ends of the pipes during rotation or, as illustrated diagrammatically in FIG. 7, two pipes 2 and 3 to be joined can be expanded against an external rotating ring 1, the clearance between the ring and the pipes being exaggerated for clarity in the diagram.

In FIG. 8, an internal plug 35 is placed inside two tubes 2 and 3 to be welded together by means of an external rotating ring 1. The plug 35 is formed with an annular groove 36 which allows penetration of the ring 1 through into the inside of the welded pipe. The groove can be so formed that its edge acts as a shear, so that if the plug is pulled axially once the weld has been formed, its edge shears off excess material on the inside of the bore.

The invention has particular application to the joining of heavy pipes in that there is no necessity to rotate the pipes or to move them axially during welding; only static clamping is required. Difficulties associated with work holding are less than with conventional friction welding machines because when a light ring is rotated, there is no requirement for arresting a high inertia rotating component. Where an expanding internal plug is used, the pipe ends can be expanded to remove bore mismatch and furthermore an internal plug reduces and may completely prevent internal flash. The invention facilitates the repair and fabrication of welds in difficult conditions, such as in the ocean depths. Where a ring is to be welded on to an existing pipe or pipe junction, the ring may be placed over the pipe or pipe junction in two parts provided that these two parts continuously surround the pipe or pipe junction, i.e., without gaps. The presence of gaps during welding would lead to oxidation of the weld surface and the weld quality would suffer.

Another advantage of the joining of two pipes by friction welding without rotating either pipe lies in the fact that the angular positions of the pipes about their axes are unchanged by the welding process; it is sometimes necessary that one pipe should have a given angular position about its axis relative to the other pipe.

In FIG. 9, which illustrates another application of the invention, a piston body 40 is formed with a combustion chamber 41. To provide better properties of wear resistance at the entrance to the combustion chamber, a ring 42 of a material having better wearing properties is welded around the entrance. The piston may be of an aluminium alloy and the wear-resistant ring may be a copper alloy. The welding can be carried out by rotating and radially expanding the ring 42 into contact with the surrounding wall of the piston 40, by the techniques described above. By suitably shaping the annular recess in the piston and the outer surface of the ring 42 which is to fit into this recess, it can be arranged that when the ring is expanded radially and welded into place, a degree of mechanical locking is also provided, the inner diameter of the recess at the top face of the piston being less than the outer diameter of the radially expanded copper alloy ring. This is an example of the welding of dissimilar metals; it is known that friction welding makes good welds between many pairs of dissimilar metals. In another process embodying the invention, an aluminium ring is used to join steel pipes.

FIG. 9 also shows piston rings 43 and 44 which can be welded into place by a method embodying the invention involving the application of external radial pressure to the rings; and gudgeon pin bearings 45 which can be welded into place by internal radial welding.

In carrying out the invention, the workpieces may be relatively rotated until sufficient heat has been developed, after which their relative rotation is braked, or other forms of friction welding can be used, for example inertia friction welding. If desired, where high speeds are required contra-rotation of the workpieces may be used.

The backing sleeve in the processes described above should be of a heat-resisting high-strength material, such as Nimonic 80A or Nimocast PK24.

The process can be automatically controlled by the methods known for conventional friction welding, i.e., by the amount or rate of displacement and the degree of forge, for example.

The sliding velocity between the two surfaces is preferably between 1½ and 5 meters per second, when the workpieces are of mild steel. During the frictional heating, a radial movement of ½ millimeter to 2 millimeters is generally sufficient for mild steel, although it is of course initially necessary to compress the outer workpiece on to the inner workpiece (or to expand the inner one on to the outer one). The rate of radial movement during frictional heating is preferably between .1 and 1 millimeter per second.

The materials and welding parameters for one friction welding process are given below.

In this example, two steel pipes were joined by means of a ring. The pipes had a nominal outer diameter of 33 millimeters and an inner diameter of 25 millimeters. The ring had a bore diameter of 27.9 millimeters and an outer diameter of 49.7 millimeters. The pipe ends were chamfered to give a groove angle of 100° and were initially separated by a distance of 0.8 millimeters. The welding rotational speed was 975 r.p.m. and the final outer diameter of the welding ring was 46 millimeters.

A small gap, for example of 0.8 millimeters, can be left between the two pipe surfaces before welding commences; this facilitates penetration of the ring through the pipes to be welded together.

I claim:

1. A method of friction welding for joining a first member with a circular hole to a second member having a circular periphery, comprising:
    arranging the second member with its said circular periphery within and co-axial with the said circular hold of the first member so that the first member encircles the second member in a continuous manner and with clearance radially therebetween;
    relatively rotating the first and second members about the common axis of the said hole and periphery;
    during such rotation, subjecting the peripheral wall of at least one of the members, remote from the other of the members, to pressure substantially exclusively perpendicular to the said axis, the pressure being substantially uniformly distributed around the said periperal wall and being directed to move the members into frictional contact;
    and continuing the relative rotation and said pressure substantially exclusively perpendicular to the said axis until sufficient frictional heat has been developed and sufficient penetration has been achieved to permit a friction weld between the outer surface of the second member and the inner surface of the first member.

2. A method according to claim 1, in which the first member is a ring and the second member a bar or tube passing through the ring, and in which relative rotation is provided by rotating the ring about the said common axis.

3. A method according to claim 2, in which during rotation the ring is subjected to pressure directed radially inwards and applied substantially all round its periphery.

4. A method according to claim 2, in which the face of the ring which is rotated in contact with the other member is chamfered at each side to reduce the area which first contacts the said other member or members.

5. A method according to claim 4, in which the other member is initially prepared with a groove to receive the chamfered sides of the said ring.

6. A method according to claim 1, in which the member to be rotated is formed, on its side opposite the member to which it is to be joined, with grooves to receive driving splines for driving the said member in rotation.

7. A method according to claim 1, in which the second member is a ring and in which the relative rotation is provided by rotating the ring about the said common axis.

8. A method according to claim 7, in which during rotation of the said ring it is expanded by pressure applied radially outwards substantially all round the ring.

9. A method according to claim 8 in which in its expanded form the ring has an outer diameter greater than the diameter of an aperture in the first member, so that a mechanical locking of the ring is achieved.

10. A method according to claim 1 for joining two members in the form of pipes, comprising placing the pipes end to end and substantially in abutting contact, placing a ring around or within the pipes so as to bridge their interface, rotating the said ring about the axis of the pipes, and during rotation subjecting the ring or the pipes at their junction to a pressure perpendicular to the common axis of the ring and pipes and directed to urge the ring and pipes into frictional contact.

11. A method according to claim 10, in which after the termination of driven rotation of the ring, axial pressure is applied between the abutting faces of the pipes.

12. A method according to claim 10, in which the face of the ring which is rotated in contact with the said pipes is chamfered at each side to reduce the area which first contacts the said pipes.

13. A method according to claim 12, in which the ends of the pipes are shaped so that together they define a groove for receiving the said chamfered sides of the ring.

14. A method in accordance with claim 10, in which the ring is formed, on its side opposite the pipes to which it is to be joined, with grooves to receive driving spines for driving the ring in rotation.

15. A method in accordance with claim 1, in which the workpieces are of metal.

16. Apparatus for joining by friction welding a first member with a circular hole to a second member having a circular periphery, comprising:
 means for supporting the two members so that the said circular periphery of the second member is within, radially clear of and co-axial with the circular hole of the first member;
 means for relatively rotating the said members about their common axis;
 and means for applying to one of the said members a pressure, uniformly distributed around substantially its whole periphery, substantially exclusively perpendicular to the said axis and being directed to urge the members into frictional contact and for maintaining said pressure while said members are relatively rotated, until sufficient frictional heat has been developed and sufficient penetration has been achieved to permit a friction weld between the outer surface of the second member and the inner surface of the first member.

17. Apparatus according to claim 16, including a collet with surface means for engaging and applying radial pressure around substantially the whole of the periphery of the member to be compressed or expanded.

18. Apparatus according to claim 17, in which the surface of the collet which engages said one the member is formed with splines, to facilitate the driving in rotation of a member formed with grooves corresponding to the splines.

19. Apparatus according to claim 16, in which the collet includes a multiple-jaw assembly, the jaws of which are movable radially by said pressure applying means during said relative rotation.

20. Apparatus for joining by friction welding two members in the form of pipes by means of a third member in the form of a ring, comprising:
 means for gripping the two pipes substantially in axial alignment, means for supporting a ring around the outside or inside of the pipes and bridging their interface;
 driving means for rotating the said ring-supporting means;
 and means for applying a pressure uniformly distributed around substantially the whole periphery of the ring and substantially exclusively in the radial direction for radially compressing or expanding, respectively, the said ring into contact with the adjacent ends of the two pipes.

21. Apparatus according to claim 20, including an expanding plug for positioning within the pipes across their interface and means for expanding the plug to support the pipes during welding.

* * * * *